United States Patent [19]

Umetsu et al.

[11] Patent Number: 4,734,694

[45] Date of Patent: Mar. 29, 1988

[54] PAGER

[75] Inventors: Shinjiro Umetsu; Yutaka Ichikawa; Koichi Nagata, all of Tokyo, Japan

[73] Assignee: NEC Corporation, Japan

[21] Appl. No.: 764,857

[22] Filed: Aug. 12, 1985

[30] Foreign Application Priority Data

Aug. 22, 1984 [JP] Japan .................................. 59-174665

[51] Int. Cl.$^4$ .......................... G08B 5/22; H04B 11/16
[52] U.S. Cl. .......................... 340/825.44; 340/825.47; 340/825.48; 455/179; 150/36
[58] Field of Search ...................... 340/825.44, 825.47, 340/825.48; 455/33, 36, 77, 76, 179, 150; 379/59, 60

[56] References Cited

U.S. PATENT DOCUMENTS

| | | | |
|---|---|---|---|
| 4,317,222 | 2/1982 | Bell et al. | 455/77 |
| 4,369,443 | 1/1983 | Giallanza et al. | 340/825.47 |
| 4,370,650 | 1/1983 | Norrell | 340/825.48 |
| 4,403,342 | 9/1983 | Borras et al. | 455/33 |
| 4,477,807 | 10/1984 | Nakajima et al. | 340/825.44 |
| 4,501,017 | 2/1985 | Higgins et al. | 340/825.44 |
| 4,618,997 | 10/1986 | Imazeki et al. | 455/76 |

Primary Examiner—Ulysses Weldon
Assistant Examiner—Ralph E. Smith
Attorney, Agent, or Firm—Laff, Whitesel, Conte & Saret

[57] ABSTRACT

A pager which is usable in a plurality of service areas is disclosed. The pager includes a radio section for selectively receiving and modulating two or more radio frequencies, and frequency switching means for switching the receive frequency of the radio section when a signal on a predetermined receive frequency fails to be received. Power source control means is provided for cutting down power consumption. The own call signal is switched at the same time as the receive frequency to offer an effect as would be provided by a plurality of pagers. The receive frequency is displayed so that the user may see a particular service area to which his or her own pager belongs.

8 Claims, 16 Drawing Figures

| Fig. 6A |         |         |
|---------|---------|---------|
| Fig. 6B | Fig. 6C | Fig. 6E |
|         | Fig. 6D |         |

PAGER

BACKGROUND OF THE INVENTION

The present invention relates to a pager and, more particularly, to a pager which is usable in a plurality of areas.

A pager is generally made up at least of a radio section for receiving and demodulating a radio frequency signal, a decoder section for decoding the demodulated signal to detect a call signal assigned to the own pager and thereby generate an alert signal, and an alert signal output section for allowing the user to perceive the alert signal. In order to cut down power consumption, a part of the pager is intermittently activated by a control signal which is generated by the decoder section. This kind of pager is disclosed in Japanese Patent Publication No. 55-5934/1980, published Feb. 12, 1980, for example.

The problem with a prior art pager of the kind described is that it is capable of receiving only one fixed frequency and, therefore, working only in a single limited service area. Stated another way, a user cannot get paging services in a plurality of areas unless he or she has all the kinds of pagers which cover all the desired service areas.

SUMMARY OF THE INVENTION

It is therefore an object of the present invention to provide a pager which is operable in a plurality of areas based on an automatic frequency switching system.

It is another object of the present invention to provide a pager which is usable in a plurality of areas and promotes efficient use of a battery.

It is another object of the present invention to provide a generally improved pager.

A pager for receiving a radio frequency signal which is modified by a signal provided by dividing one frame of a paging signal into a plurality of groups each of which is made up of a call signal, a frame detection signal which is the same as frame detection signals of the other groups, and a group designation signal which differs from group designation signals of the other groups of the present invention comprises a radio section for receiving one of n frequencies (n being an integer not smaller than 2), a channel control section for controlling a receive frequency assigned to the radio section, a timing generator section for performing a control such that only an own group with which the pager is associated is received, and a synchronization control section for controlling a synchronization condition of the pager with the own group. The timing generator section operates in a first intermittent reception mode when a power source of the pager is turned on or when the pager is non-synchronous to the own group and in a second intermittent reception mode when the pager is synchronous to the own group. During the first intermittent reception mode operation, the channel control section sequentially switches the receive frequency until a frame detection signal has been detected, while the synchronization control section tunes the pager to the own group. When the pager has been tuned to the own group, the channel control section locks the receive frequency at a particular frequency which has occurred when the pager has been tuned.

In accordance with the present invention, a pager which is usable in a plurality of service areas includes a radio section for selectively receiving and demodulating two or more radio frequencies, and frequency switching means for switching the receive frequency of the radio section when a signal on a predetermined receive frequency fails to be received. Power source control means is provided for cutting down power consumption. The receiver's own call signal is switched at the same time as the receive frequency to offer an effect as would be provided by a plurality of pagers. The receive frequency is displayed so that the user may see a particular service area to which his or her own pager belongs.

The above and other objects, features and advantages of the present invention will become more apparent from the following detailed description taken with the accompanying drawings.

BRIEF DESCRIPTION OF THE DRAWINGS

FIGS. 3A-3D are timing charts representative of channel switching which occurs after a power source has been turned on;

DESCRIPTION OF THE PREFERRED EMBODIMENTS

Figure 1:
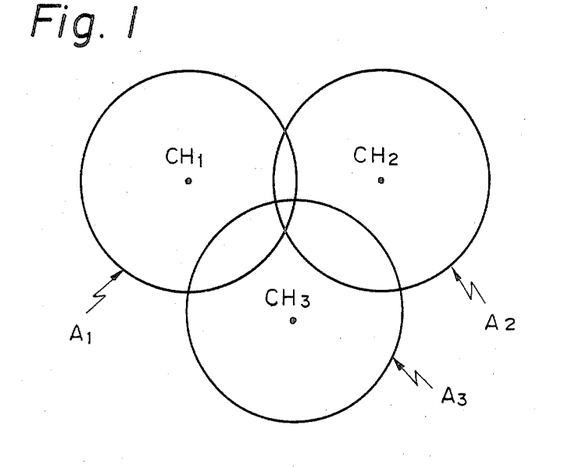
FIG. 1 shows exemplary service areas to which the present invention is applicable.

Referring to FIG. 1 of the drawings, service areas to which the present invention is applicable is schematically shown and labeled $A_1$, $A_2$ and $A_3$. In the areas $A_1$-$A_3$ paging serives are available at the frequencies of their center channels $CH_1$-$CH_3$, respectively. In accordance with the present invention, in order that the pager may be put under the paging services in any of the areas $A_1$-$A_3$, a transmitting side transmits paging signals from all the areas $A_1$-$A_3$ when a call is requested. The present invention pertains to a receiver and, therefore, details of the transmitting side will not be described.

Figure 2:
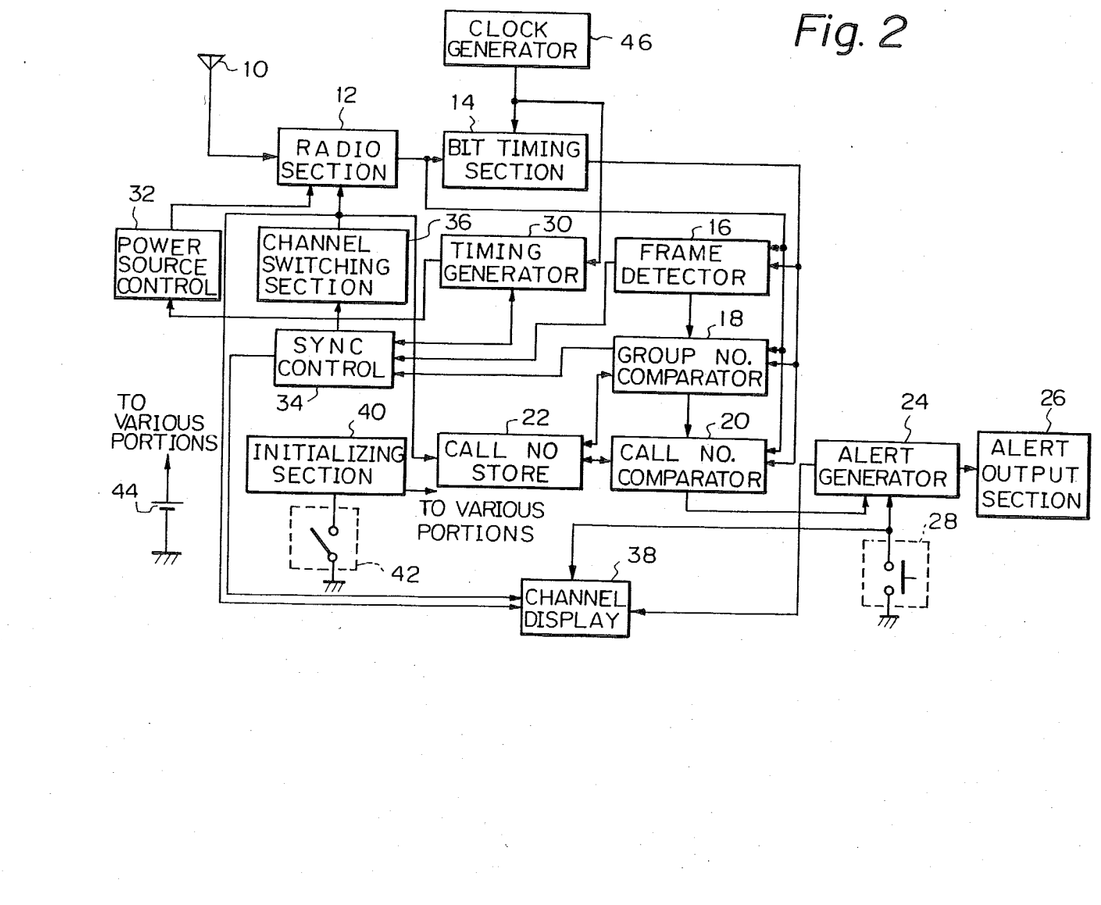
FIG. 2 is a block diagram of a pager embodying the present invention.

Referring to FIG. 2, a pager embodying the present invention is shown. As shown, the pager includes a radio section 12 to which a radio frequency signal coming in through an antenna 10 is efficiently applied. The radio section 12 demodulates the received signal and feeds the demodulated signal to a bit timing section 14, a frame detector section 16, a group number comparator section 18, and a call number comparator section 20.

Figure 3A:
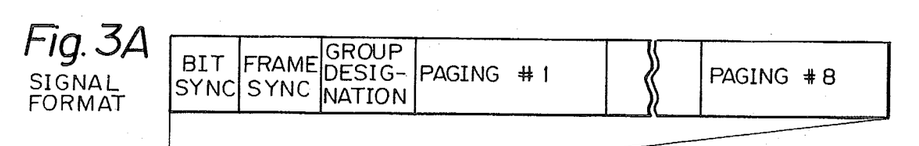
Figure 3B:
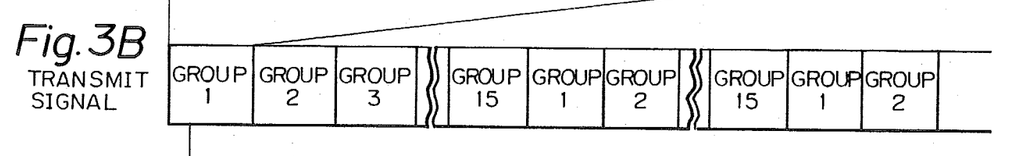

An example of the received signal is shown in FIGS. 3A and 3B. A bit sync signal shown in FIG. 3A comprises a stream of alternating ONEs and ZEROs. The bit timing section 14 sets up bit synchronization based on the bit sync signal and delivers a timing signal to the frame detector section 16, group number comparator signal 18, and call number comparator section 20.

A frame sync signal shown in FIG. 3A has a particular pattern which is the same throughout all the groups 1-15. The frame detector section 16 determines the start timing of each of the groups responsive to the frame sync signal.

A group designation signal shown in FIG. 3A is a signal which differs from one group to another. The group number comparator section 18 compares the group designation signal with a group number which is provided by driving a call number store section 22, thereby determining whether or not the group designation signal designates the own group.

As shown in FIG. 3A, eight discrete sets of paging signals are assinged to each group. The call number comparator section 20 compares a paging signal with a call number which is provided by driving the call number store 22, thereby deciding whether or not the received signal is meant for the own pager. If the paging signal is coincident with the own call number, the call number comparator section 20 applies a detection signal to an alert generator section 24. Then, the section 24 generates an alert signal with the result that a speaker or like alert output section 26 is driven to sound. When a reset switch 28 is closed while the pager is sounding, the alert output section 26 is deactivated.

As described later in detail, a timing generator section 30 is adapted to control a power source control section 32 to thereby intermittently set up power supply to the radio sectin 12. A sync control section 34, to which output signals of the frame detector section 16 and group number comparator section 18 are applied, delivers an output signal to the timing generator section 30 to change the timing of intermittent reception and feeds an output signal to a channel switching section 36, when the pager is not synchronized, or tuned, to the received signal. The channel switching section 36 responsive to the output signal of the sync control section 34 changes the receive frequency of the radio section 12 and applies a signal to the call number store 22 in order to replace the stored group number and call number with those which are associated with the new receive frequency. A channel display section 38 is made operable by an output signal of the sync control section 34 when the pager is tuned to the received signal and the altert generator section 24 is inoperable. When the reset switch 28 is closed, the channel display section 38 displays a receive frequency responsive to a signal from the channel switching section 36. Although omitted for simplicity, an initializing section 40 is interconnected to various sections of the pager in order to initialize them when a power switch 42 is turned on. A battery 44 is adaped to supply power to the various sections of the pager. A clock generator 46 provides a reference signal which is fed to the bit timing section 14 and the timing generator section 46.

Figure 3C:
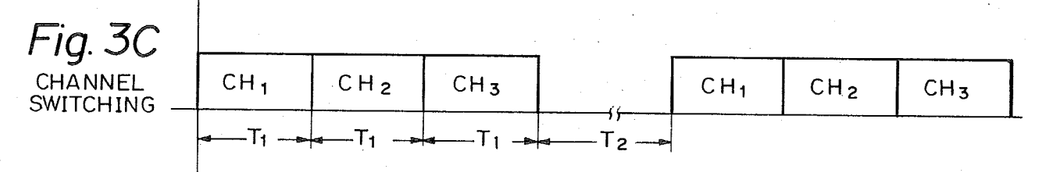
Figure 3D:
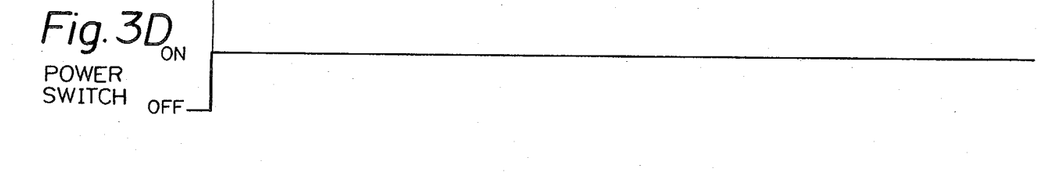

The operation of the pager which follows a turn-on of the power switch 42 will be described with reference to FIGS. 3A-3D and 6. The operation of the power switch 42 of FIG. 2 is shown in FIG. 3D. As the switch 42 is turned on (step S1 shown in FIG. 6), i which is a variable for specifying a frequency i (channel i) as will be described becomes 1 (one) at a step S2. At a step S3, a first battery saving mode operation which is adapted for power saving begins. As shown in FIG. 3C, the first battery saving mode operation implies an occurence that a receive condition which continues over a duration of n times T1 (in FIG. 3C, n=3) and a non-receive condition which continues over a period of T2 are caused to periodically alternate with each other. As previously mentioned, the first battery saving is controlled by the timing generator section 30. Here, T1 represents a period of time necessary for receiving a frame sync signal once or more; in the example of FIG. 3C, it is long enough to receive a frame sync signal twice.

At a step S4, the channel switching section 36 tunes the pager to a channel 1 (i=1) so that the pager receives a frequency assigned to the channel 1. At steps S5 and S6, whether or not a frame sync signal has been received during the previously mentioned period of time T1 is monitored. If no frame sync signal has been received during the period T1 at the instantaneous receive frequency, i is changed at a step S7. As i is incremented one by one at the step S7 until it exceeds the number of channels assigned to the pager, decision is made at a step S8 and, at step S9, i=1 is set again. In this manner, if no frame sync signal has been received during the period T1, the operation returns to the step S4 to switch the channel to a newly set up one, i.

Figures 4A, 4B:
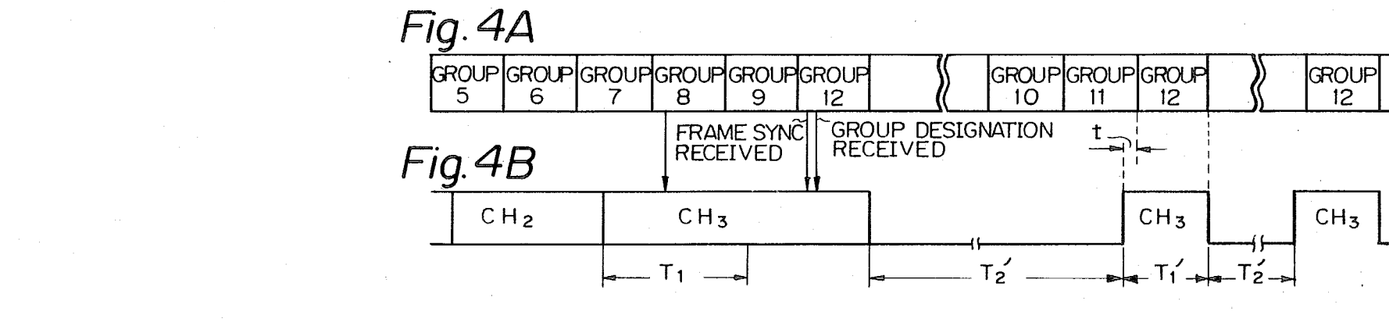
FIGS. 4A and 4B are timing charts representative of channel switching adapted to synchronize the pager to the own group.

Reference will be made to FIGS. 4A, 4B and 6 for describing how the pager operates when a frame sync signal has been received at the step S5. As a frame signal is received at the step S5, the battery saving is cancelled at a step S10. At the subsequent steps S11 and S12, whether a frame sync signal and a group designation signal are received during the period of fifteen groups is checked. In the example shown in FIGS. 4A and 4B, a frame sync signal is received on the channel 3 to cancel the battery saving, then another frame sync signal is received, and then a group designation signal meant for the own group (group 12 in this particular example) is received. After a particular channel has been found in the manner described, a channel position is reported on the channel display section 38 at a step S13. As the own group designation signal is received, a second battery saving mode operation is started at a step S14 for power saving purpose. The second battery saving is such that, as shown in FIGS. 4A and 4B, only the own group is received during a period T1' and the reception is interrupted for a period T2' which is associated with the other groups. As shown in FIGS. 4A and 4B, the period T1' is longer than the duration of the own group by a time t which is the rising time necessary for the reception to be resumed after the interruption.

At a step S15, whether or not the own paging signal is received is determined. When it has been received, the frame sync signal and group designation signal are monitored again at steps S16-S19 to see if synchronization to the own group has been set up. If not, then whether or not the frame sync signal or the group designation signal has failed ten consecutive times is checked at a step S18 or S19. If it has so failed, it is decided that the synchronization has failed and the operation returns to the step S3 to repeat the tuning procedure. The steps S16-S19 are adapted to enhance the reliability of reception.

The same sequence of events as described above occur when no paging signal is received at the step S15. Specifically, at steps S20-S23, the frame sync signal and the group designation signal are monitored again in order to confirm synchronization to the own group. If not, whether the frame sync signal or the group designation signal has failed ten consecutive times is determined at the step S22 or the step S23. If it has so failed, the operation returns to the step S3 for tuning the paper again. If synchronization to the own group has been set up at the step S21, whether the own paging signal is received is decided at a step S28.

In the above condition wherein the pager has been tuned to the own group at the step S21 and the own paging signal has been received at the step S28, an alerting operation for informing the user of the call begins at a step S29. Steps S24–S27, like the steps S16–S19 or the steps S20–S23, are for monitoring to see whether the pager in reception is tuned to the own group and, if not, they are followed by the step S3 for another tuning procedure. So long as the pager is tuned to the receive frequency of a particular area, it repeats the steps S24–S29.

When the operation has returned to the step S3 as a result of the decision at the steps S18, S19, S22, S23, S26 and S27 that the pager has not been tuned to the own group, a first battery saving mode operation begins in the same manner as in the initial power turn-on stage. At the step S4, the same channel i as the channel having been received up to that time is set up. This is because, for example, the service area is not expected to abruptly change from one to another and, hence, resynchronizing the pager by receiving a signal on a particular channel to which the pager has once been synchronized offers a high probability of resynchronization.

Figures 5A, 5B:
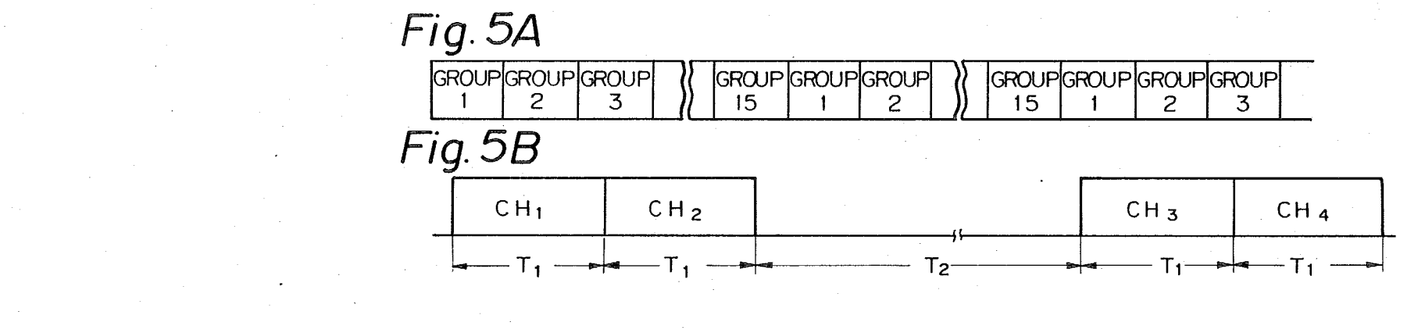
FIGS. 5A and 5B are timing charts demonstrating channel switching in accordance with another embodiment of the present invention.
Figure 6A:
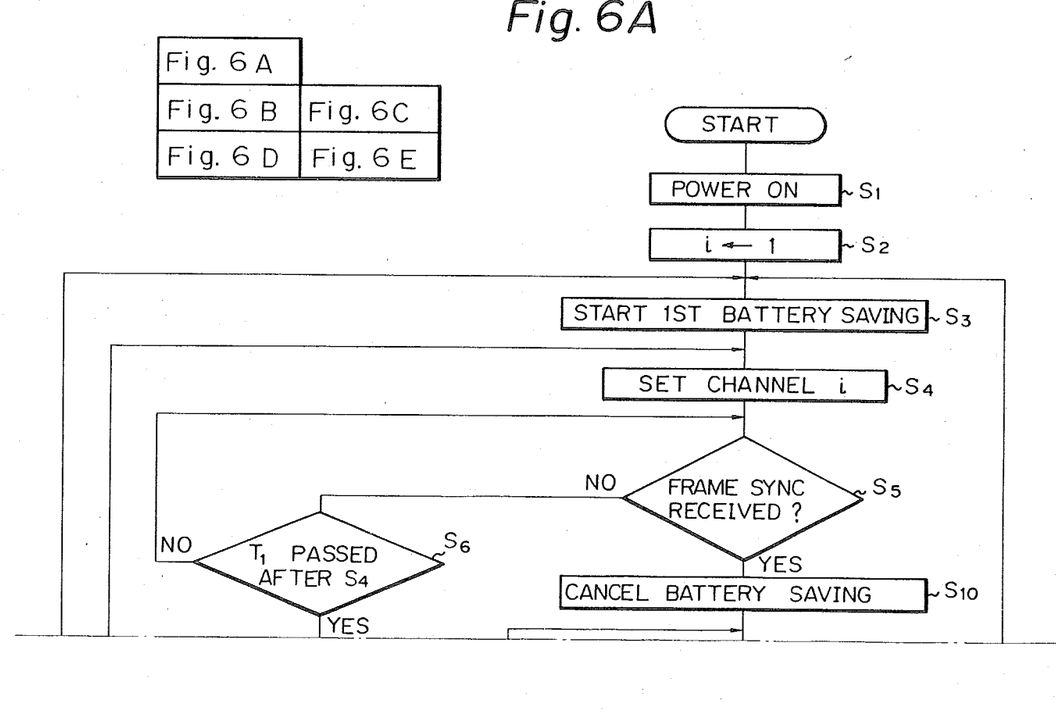
FIGS. 6A-6E are flowcharts showing the operation of the present invention.
Figure 6B:
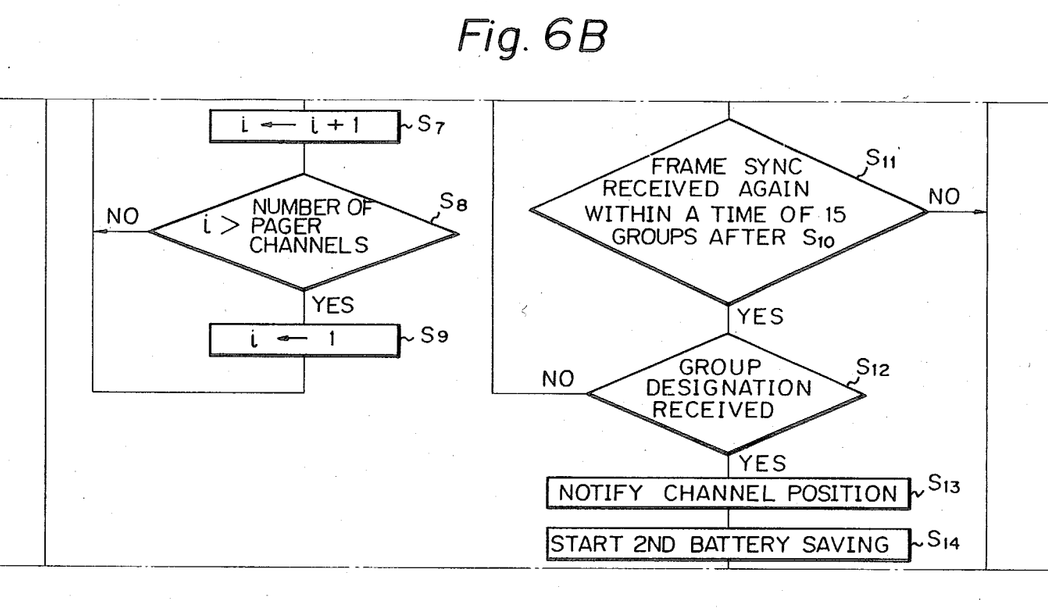
Figure 6C:
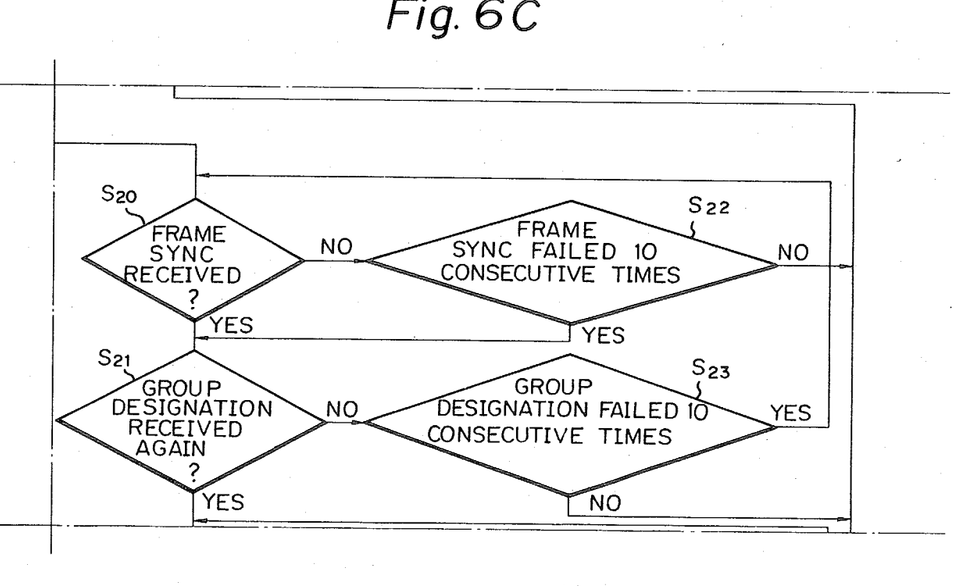
Figure 6D:
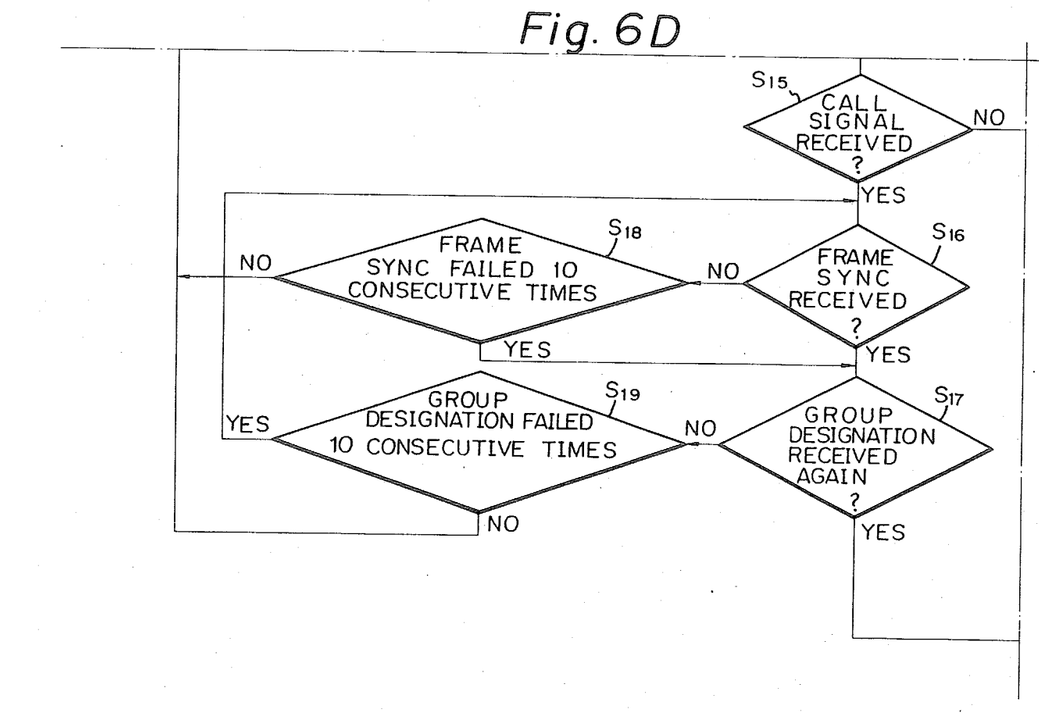
Figure 6E:
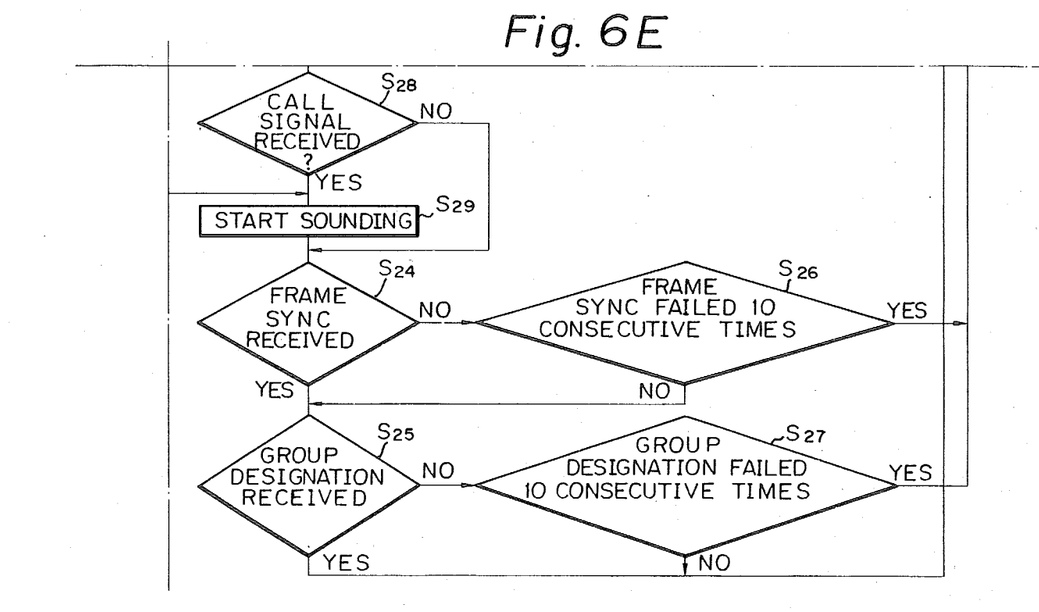

While the pager of the present invention has been shown and described as having three channels, it will be apparent that four or more channels may be assigned to the pager. However, increasing the number of channels is at a cost, i.e. increasing power consumption while the pager is not tuned to the own group. In subway or like insensitive zones, for example, the pager cannot receive signals and wastefully consumes a substantial amount of power. The present invention is also furnished with an implementation for solving such a problem. Specifically, as shown in FIGS. 5A and 5B, when the power source has been turned on or when the synchronization has failed, the pager does not receive all the channels at a time and, instead, divides the channels by twos so as to monitor each two channels at a time. During the first intermittent reception mode operation, the channel control section 36 divides the receivable frequencies (channels CH1 to CH4) into frequency groups (CH1 and CH2; and CH3 and CH4), as shown in FIG. 5B. The channel control section 36 sequentially switches and receives the frequencies in the respective frequency groups (CH1 and CH3 or CH3 and CH4) within a received period of time (2T1) of a single intermittent reception (2T1+T2). Where the pager is to be restored to a synchronous condition after the failure of synchronization, it is preferable that the procedure starts with a particular channel group to which the channel frequency having been received up to that time belongs, as in the case of FIGS. 3A–3D and FIGS. 4A and 4B. To further enhance the efficiency, an arrangement may be made such that the frequencies are regrouped to retune the pager with the channel frequency having been received till then positioned at the head of the groups.

The operation of the pager associated with the implementation shown in FIGS. 5A and 5B will readily be seen by analogy from the flowchart of FIG. 6.

Figure 7:
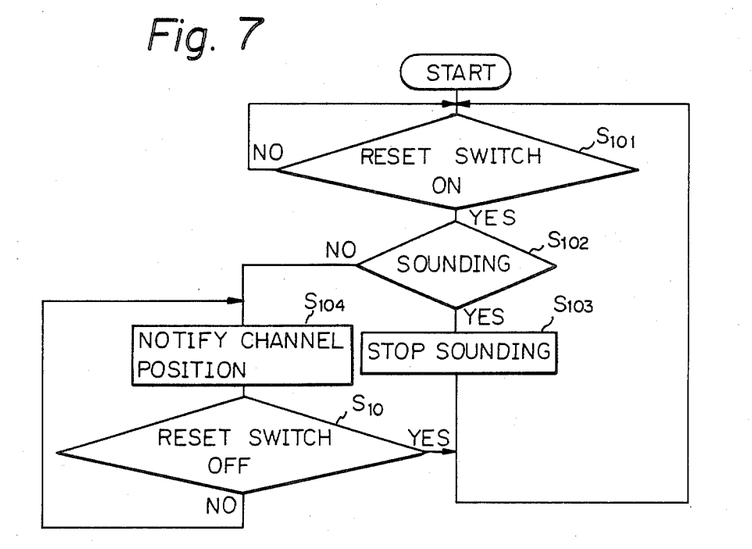
FIG. 7 is a flowchart associated with manipulation of a reset switch.

Referring to FIG. 7, a flowchart associated with manipulation of the reset switch 28 is shown. As the reset switch 28 is turned on at a step S101, if the pager is found sounding at a step S102, the sound is interrupted at a step S103; if it not sounding, a channel position is displayed only while the reset switch 28 is turned on at steps 104 and S105. The display of a channel position may be implemented with a plurality of light emitting diodes (LED) or a liquid crystal display (LCD) by way of example. While in this example a channel position is displayed only while the reset switch 28 is turned on, a timer may be used such that it is triggered by the turn-on of the reset switch 28 to show a channel position only during a period of time which is determined by the timer.

In summary, it will be seen that the present invention provides a pager which is usable in a plurality of service areas and cuts down power consumption because it is capable of receiving two or more different frequencies and, after detecting a particular frequency which can be tuned to a sync signal from a base station and then fixing the channel, performs reception only during necessary periods.

Various modifications will become possible for those skilled in the art after receiving the teachings of the present disclosure without departing from the scope thereof.

What is claimed is:

1. A pager comprising:
   a radio section for selectively receiving one of n radio frequency signals (n being an integer not smaller than 2) whose frequencies are different from each other, each radio frequency signal being modulated by a signal comprising a plurality of paging signal groups each of which is made up of at least a frame sync which is the same as frame sync signals of the other groups, a group designation signal which differs from group designation signals of the other groups, and a plurality of paging signals;
   a channel control section for controlling a receive frequency assigned to said radio section;
   a timing generator section for performing a control such that only an own paging signal group with which the pager is associated is received; and
   a synchronization control section for controlling a synchronization condition of the pager with the own paging signal group;
   said timing generator section operating in a first intermittent reception mode when a power source of the pager is turned on or when the pager is non-synchronous to the own paging signal group and in a second intermittent reception mode when the paper is synchronous to the own paging signal group;
   during the first intermittent reception mode operation the channel control section sequentially switching the receive frequency until a frame sync signal has been detected, the synchronization control section tuning the pager to the receive frequency on which the frame sync signal has been detected;
   when the pager has been tuned to the own group, the channel control section locking the receive frequency at a particular frequency which has occurred when the pager has been tuned.

2. A pager as claimed in claim 1, wherein during the first intermittent reception mode operation the channel control section divides the receivable frequencies into groups a plurality of first frequency groups, and sequentially switches and receives the frequencies in the respective first frequency groups within a receive period of time of a single intermittent reception.

3. A pager as claimed in claim 2, wherein, the channel control section during the first intermittent reception mode operation, subsequent to a change from a synchronous state to a non-synchronous state with respect to the own paging signal group switching the receive frequencies beginning with a particular one of the first frequency groups to which a particular receive frequency immediately before the non-synchronous state belongs.

4. A pager as claimed in claim 2, wherein said channel control section during the first intermittent reception mode operation, after a change from the synchronous state to the non-synchronous state redivides the receivable frequencies into a plurality of second frequency groups which are headed by a particular one of the frequency groups which has the receive frequency to which the pager has been tuned immediately before the change from the synchronous state to the non-synchronous state, and switches the receive frequencies beginning with the heading frequency group.

5. A pager as claimed in claim 1, further comprising a display for visual identification of the receive frequencies.

6. A pager as claimed in claim 5, further comprising a switch for activating the display.

7. A pager as claimed in claim 6, wherein the switch also functions as a switch for stopping notification of a call which is meant for the pager.

8. A pager as claimed in claim 1, wherein at least one of a group designation signal and paging signal which are assigned to the pager is altered when the receive frequency is switched.

* * * * *